United States Patent [19]

Allada

[11] 4,333,780
[45] Jun. 8, 1982

[54] SUBMERSION TREATMENT OF FOAMABLE THERMOPLASTIC SHEET ON PREFORMS

[75] Inventor: Sambasiva R. Allada, Midland, Mich.

[73] Assignee: The Dow Chemical Company, Midland, Mich.

[21] Appl. No.: 212,179

[22] Filed: Dec. 2, 1980

[51] Int. Cl.³ .............................................. B29D 27/00
[52] U.S. Cl. ........................................... 156/78; 226/7; 226/97; 264/54; 264/500; 264/557; 264/DIG. 18; 271/195; 425/71; 425/817 C; 432/8
[58] Field of Search ............... 264/54, 51, 53, DIG. 9, 264/557, 500, DIG. 18; 226/7, 8, 97; 271/194, 195, 8 R, 195; 156/77, 78; 425/71, 817 C; 432/8

[56] References Cited

U.S. PATENT DOCUMENTS

| | | | |
|---|---|---|---|
| 2,444,731 | 7/1948 | Devol | 226/97 X |
| 2,538,972 | 1/1951 | Magnani | 271/194 X |
| 3,078,022 | 2/1963 | Durbeck et al. | 226/97 |
| 3,186,326 | 6/1965 | Schmidt | 226/97 X |
| 3,197,339 | 7/1965 | Black et al. | 226/97 X |
| 3,310,062 | 3/1967 | Little | 226/97 X |
| 3,562,367 | 2/1971 | Shinohara et al. | 264/54 X |
| 3,587,598 | 6/1971 | Miyamatsu et al. | 226/97 X |
| 3,744,693 | 7/1973 | Greiner | 226/97 |
| 3,804,567 | 4/1974 | Recknagel | 425/71 |
| 3,812,230 | 5/1974 | Takahashi | 264/177 X |
| 4,078,033 | 3/1978 | Czerwon et al. | 425/71 X |
| 4,138,047 | 2/1979 | Sherman | 226/7 |
| 4,143,106 | 3/1979 | Coyne | 264/51 |
| 4,146,633 | 3/1979 | Ratafia et al. | 264/51 |
| 4,155,965 | 5/1979 | Allada | 264/54 X |
| 4,178,397 | 12/1979 | Lovis | 427/300 |

FOREIGN PATENT DOCUMENTS 47-24269  7/1972  Japan .................................. 264/51

OTHER PUBLICATIONS

Derwent Abstract of Japanese Patent No. 22674/68 entitled: "Polyethylene Foam Sheets".
Shiina, Naonori; Masaya Tsuchiya and Hiroyuki Nakae, "Properties and Application Techniques of Crosslinked Polyethylene Foams (1)", In *Japan Plastics Age*, Dec. 1972, pp. 37–48.
Kirkland, Carl, Assist. Edt., "Crosslinked PB Foam Sheet: New Continuous Process Arrives", In *Plastics Technology*, Nov. 1980, pp. 89–92.

Primary Examiner—Philip Anderson
Attorney, Agent, or Firm—Jonathan W. Morse; James B. Guffey

[57] ABSTRACT

Method for treatment of a solid material submerged in a body of liquid wherein the material is sticky and/or has relatively low tensile strength. The material being treated is supported, while so submerged, by a dynamic boundary layer of a liquid material between the treated material and a stationary porous restraining surface, the layer being created by the forced diffusion of said liquid through the pores of said stationary surface. The method is illustrated by heating and thereby foaming a strip of heat foamable thermoplastic resin while it is held submerged in a denser heat transfer liquid by a dynamic layer of said heat transfer liquid, said layer of heat transfer liquid being created by the forced diffusion thereof through a porous plate in operative communication with a pressurized chamber containing a supply of said liquid.

5 Claims, 3 Drawing Figures

SUBMERSION TREATMENT OF FOAMABLE THERMOPLASTIC SHEET ON PREFORMS

BACKGROUND OF THE INVENTION

This invention relates in a general aspect to a continuous process for treating a solid material during submersion in a body of liquid, and in another aspect to a method for making foam sheets by a process wherein foamable thermoplastic resinous sheets or preforms are continuously foamed by submersion in a body of heated liquid.

It is known in the art to produce thermoplastic resin foam in sheet form by compounding such a resin, e.g., polyethylene, with a thermally-decomposable blowing agent, e.g., azodicarbonamide; heat-plastifying the composition under conditions not causing decomposition of the blowing agent and fabricating therefrom a non-cellular sheet and crosslinking the resulting sheet, e.g, by high energy electron beam irradiation or chemical crosslinking means, to obtain a crosslinked foamable sheet. Thereafter, the resulting crosslinked foamable sheet is optionally preheated to temperatures below the decomposition temperature of the blowing agent and is then heated to effect decomposition of the blowing agent and formation of gas-filled predominately closed cells in a resulting foamed resin sheet product. However, in the aforementioned type of foaming process, it is, by virtue of the relatively low thermal conductivity of thermoplastic resins (and especially of closed cell foams thereof), generally difficult to heat the crosslinked sheet product uniformly throughout to obtain uniform foaming, particularly when the heating/foaming operation is conducted in a continuous manner. Moreover, since the foaming sheet is expanding in all directions and since the resin is in heat-softened condition when being foamed, it is generally desirable that said foaming sheet be supported in some way during said foaming operation.

There are several methods which have been suggested to avoid the above-noted problems which are encountered while foaming foamable resin preforms, but in the attempts made to date other problems have arisen making such methods far from ideal.

In U.S. Pat. No. 3,562,367 to Shinohara et al., there is described a float process of foaming foamable crosslinked olefinic resin sheet. In that process, such a sheet is heated in part and supported by floating it on the surface of a liquid which has a density greater than that of both the unfoamed sheet and the foamed sheet prepared therefrom and which is maintained at a temperature suitable for effecting the foaming. In such process, the sheet is also concurrently heated from above by a radiant heat source. A suitable heat transfer liquid is a molten mixture of low melting salts, such as a mixture comprising potassium nitrate and sodium nitrite and nitrate, which melts at a temperature below the foaming temperature of the foamable sheet and which is used at a temperature that softens the sheet and decomposes the blowing agent. In such foaming step, the sheet is supported on the flat upper surface of the heat transfer liquid and is free to expand in all directions as the sheet foams while so supported. However, the heating of the foamable sheet to effect foaming thereof by heat transferred from the liquid beneath the sheet to the underneath side thereof must be exactly matched by heat transferred to the upper side of the sheet by the radiant heating sources above the sheet, e.g., infrared lamps or like devices. Attaining such matching is particularly difficult in continuous operation where the foamable sheet continuously moves across the surface of the heat transfer liquid bath, foams, and is continuously taken off and away as foamed sheet, wherein the temperature of the sheet changes during such transit and the temperature profiles of the sheet may also change during the operation. Moreover, sheets of some resins, such as radiation crosslinked linear polyethylene, which are susceptible to degradation and other deleterious effects of exposure to air at high temperatures, cannot consistently be foamed by the liquid bath surface float method without elaborate and inconvenient measures to maintain an appropriately inert atmosphere over the liquid bath.

In U.S. Pat. No. 4,143,106 to Coyne, there is described a method for foaming a foamable thermoplastic resin preform by floating such preform upon a heated liquid bath while heating it from above by flooding the upper surface of the floating preform with a blanket of liquid at substantially the same temperature as that in the heated bath. This process helps reduce the amount of the heated foam surface in contact with air but typically does not entirely eliminate such contact with air. Moreover, other problems such as non-uniform heating can still be encountered.

In U.S. Pat. No. 4,155,965 to Allada, there is described a process for heat foaming foamable preforms by totally submerging them in a heated liquid bath. In such process, the foaming preform is kept submerged under a fast moving endless belt which generates a dynamic fluid boundary layer, which prevents direct contact between the foam and the belt and which thereby allows transport of the foam while it is sticky and has little tensile strength. Under some conditions, however, such as when the belt speed is much higher than the foam transport speed and the temperature is high, the shear stress exerted by the belt and the dynamic fluid layer can stretch the soft expanding sheet undesirably. In addition, the machinery and moving parts required for this process complicate its use.

In addition, the general handling problems caused by the stickiness and low tensile strength of the hot foaming resin are similar to problems which are encountered in many other process operations where a soft solid sheet or strip is submerged in a treating liquid of greater density under conditions that the solid is sticky and/or has insufficient tensile strength to withstand the stretching forces involved in handling and/or conveying the resin preform.

In view of the foregoing, it would be desirable to provide an improved method and means for carrying out such method for treating solid materials which are sticky and/or have low tensile strength. Particularly, it would be desirable to provide method and means to effect foaming of a heat foamable material preform especially in the form of sheet comprising crosslinked thermoplastic resin and foaming agent such as thermally decomposable chemical blowing agent, which method and means would supply the necessary heat uniformly and simultaneously to all sides of the foamable and foaming material while at the same time protecting it from exposure to deleterious atmosphere, and would allow the foaming material to expand freely in all directions without distortions and without undesirable stretching due to shear stresses while carrying out the operation in a continuous and efficient manner.

A general object of this invention is to provide improved method and means for treating solid materials which are sticky and/or have little tensile strength.

A more specific object is to provide method and means to make thermoplastic resin foam, especially in sheet form, from foamable thermoplastic resin composition containing latent foaming agent such as thermally decomposable chemical foaming agent in continuous manner by continuously submerging the foamable material in a body of heat transfer liquid and conducting the material and resulting foaming and foamed product through and out of such body of liquid.

Other objects and advantages of the invention will become evident in the description that follows.

SUMMARY OF THE INVENTION

These benefits and other advantages are achieved according to the present invention, which in one aspect is an improved continuous method of treating a solid material by submerging it into and passing it through and out of a body of liquid having a density different than that of the solid material being treated, wherein the material is soft, has low tensile strength or tends to stick to solid surfaces while so submerged in the liquid. The improvement of this process comprises supporting the material against forces resulting from said density differential while so submerged by using a protective dynamic fluid boundary layer generated by the forced diffusion of a fluid through the pores of a stationary porous plate, the plate functioning as a material restraining means, said dynamic fluid layer separating and preventing contact between the material being treated and the surface of the porous plate.

In another aspect, the present invention is a continuous method of preparing a thermoplastic foam article wherein a heat foamable crosslinked thermoplastic preform is heated to a temperature at or above the foaming temperature of the foamable preform, said foaming temperature being at or above the decomposition temperature of a blowing agent compounded in the preform and at or above the heat softening temperature of the thermoplastic resin. This heating is achieved by submerging said preform into and passing it through and out of a body of a liquid heat transfer medium which is at or above the foaming temperature of the foamable preform and said preform is thereby being heated and foamed. During this time said preform is typically soft, sticky and/or of low tensile strength. The resulting foamed resin product is then removed from the body of the heat transfer liquid, which liquid has a greater density than the foaming and foamed resin product. This invention comprises an improvement of this process wherein the foamable and foaming resin preform is held submerged while in the body of heat transfer liquid under and by a protective dynamic fluid boundary layer generated by the forced diffusion of a fluid through the pores of a stationary porous plate, this diffused fluid is at substantially the same temperature as the liquid heat transfer medium. Said dynamic fluid layer separates and prevents contact between the soft, sticky, foamable, foaming and foamed resin preform and the surface of the porous plate.

In another aspect, the present invention is an apparatus for continuously forming foamed resin products from heat foamable thermoplastic resin preforms. This apparatus comprises a vessel adapted for holding a body of heat transfer liquid, means for controllably heating said liquid at a temperature at or above the heat foaming temperature of the foamable thermoplastic resin preform, means for continuously passing the foamable resin preform into and submerging it in the body of heat transfer liquid, whereby the foamable resin preform is heated to its foaming temperature and foams, and means for continuously taking the resulting foamed resin product out of the body of heat transfer liquid. The liquid involved is more dense than the foamed resin product. The present apparatus also comprises and is particularly characterized by a porous plate means, through the pores of which is forcibly diffused amounts of the heat transfer liquid sufficient to generate and maintain a dynamic layer of the heat transfer liquid above resin preform and below the porous plate. This dynamic layer holds the foaming resin preform submerged while in the body of heat transfer liquid. Said porous plate means is positioned above the path that would be taken by the foamable and foaming resin preform through the apparatus at least from a point just before the resin preform would reach its heat foaming temperature to a point where the foaming of the foamable resin preform would be substantially complete.

The practice of the improved process of the present invention exhibits particular benefits in the area of submersion foaming of crosslinked thermoplastic resin preforms in that it permits foaming of such preforms by uniform and rapid heating from both sides simultaneously. As a result of the uniform expansion, the foamed produced exhibits reduced amounts of distortion, especially in thick, low density foams. Moreover, the present invention allows expansion of the foam in all directions without sticking to solid surfaces or stretching of the foam by large shear stresses which could be created if movable or rotating supporting means (e.g., belts, rotating rollers, etc.) were employed. The invention also reduces exposure of the hot resin foam to air thereby reducing the potential for oxidation and degradation of the polymer employed therein. Further, the foaming apparatus employed is relatively uncomplicated and requires no submerged moving parts to keep the material preform submerged. Moreover, since the present invention uses only a stationary porous plate with an attached hose or pipe supplying the desired liquid under pressure, several of these can be used concurrently, in vertical layers, one below the other, to simultaneously foam several preforms and allow the freshly foamed articles to be laminated in-process into thicker sheets than producible otherwise. See FIG. 1a.

Although the invention is illustrated by application to the foaming of foamable resin preforms which are sticky and weak when in the hot foaming condition, it will be evident that the principles illustrated thereby are generally applicable. Thus, whenever a soft solid preform is submerged in a treating liquid of different density under conditions that the solid preform is sticky and/or has little tensile strength, advantages accrue by carrying out the operations in accordance with the invention by supporting the soft, sticky and/or weak solid preform by a dynamic layer of liquid maintained in the manner described.

DETAILED DESCRIPTION AND EMBODIMENTS

Heat foamable thermoplastic resins, blowing agents and means of fabricating crosslinked foamable sheets and preforms therefrom, which are suitable for use in conjunction with the improvement of the present invention are generally known in the art. Examples of such materials and means are disclosed in detail in U.S. Pat. No. 3,562,367 to Shinohara et al.; U.S. Pat. No. 4,143,106 to Coyne and U.S. Pat. No. 4,155,965 to Allada, the teachings of all of which are hereby incorporated by reference into the present description.

The essence of the improvement of the present invention as applied to the foaming of foamable thermoplastic resin preforms resides in an improved means to keep the foamable resin preform submerged in a liquid heat transfer medium with particular attention being directed to the resin preform during its foaming stage when it is commonly sticky, relatively weak and expanding in all directions. The concept of the present invention so applied is to support the resin material, particularly in its foaming and freshly foamed condition while it is being passed through the body of heat transfer liquid, so as to limit the upward movement of the preform through the liquid due to the buoyancy thereof in the heating medium, by providing above the path of preform through the heating medium a stationary foam restraining means. Pursuant to the present invention also, there is created below the stationary restraining means and above the preform being transported a dynamic boundary layer of fluid of preferably the same type and at substantially same temperature as the heat transfer liquid in the submersion foaming bath. This fluid could, however, be a liquid of different composition or could also be a gaseous composition. This layer is generated and maintained by the forced diffusion of heating medium liquid through a porous plate which comprises the lower foam engaging surface of the stationary restraining means. Thus, the foamed and foaming resin material is only indirectly guided along the porous plate of the stationary restraining means. During the foaming stage and as freshly expanded foam, the resin material preform is not in direct frictional contact with any solid surface; it is at all such times surrounded by the body of heat transfer liquid. In short, pursuant to the present invention, the dynamic layer of liquid, diffused through the porous plate and overlying the foamed and foaming resin, supports it in a controlled manner against the buoyant forces and limits its upward movement as it moves through the body of heat transfer liquid and at the same time prevents direct contact between the sticky preform and the restraining means.

Figure 1:
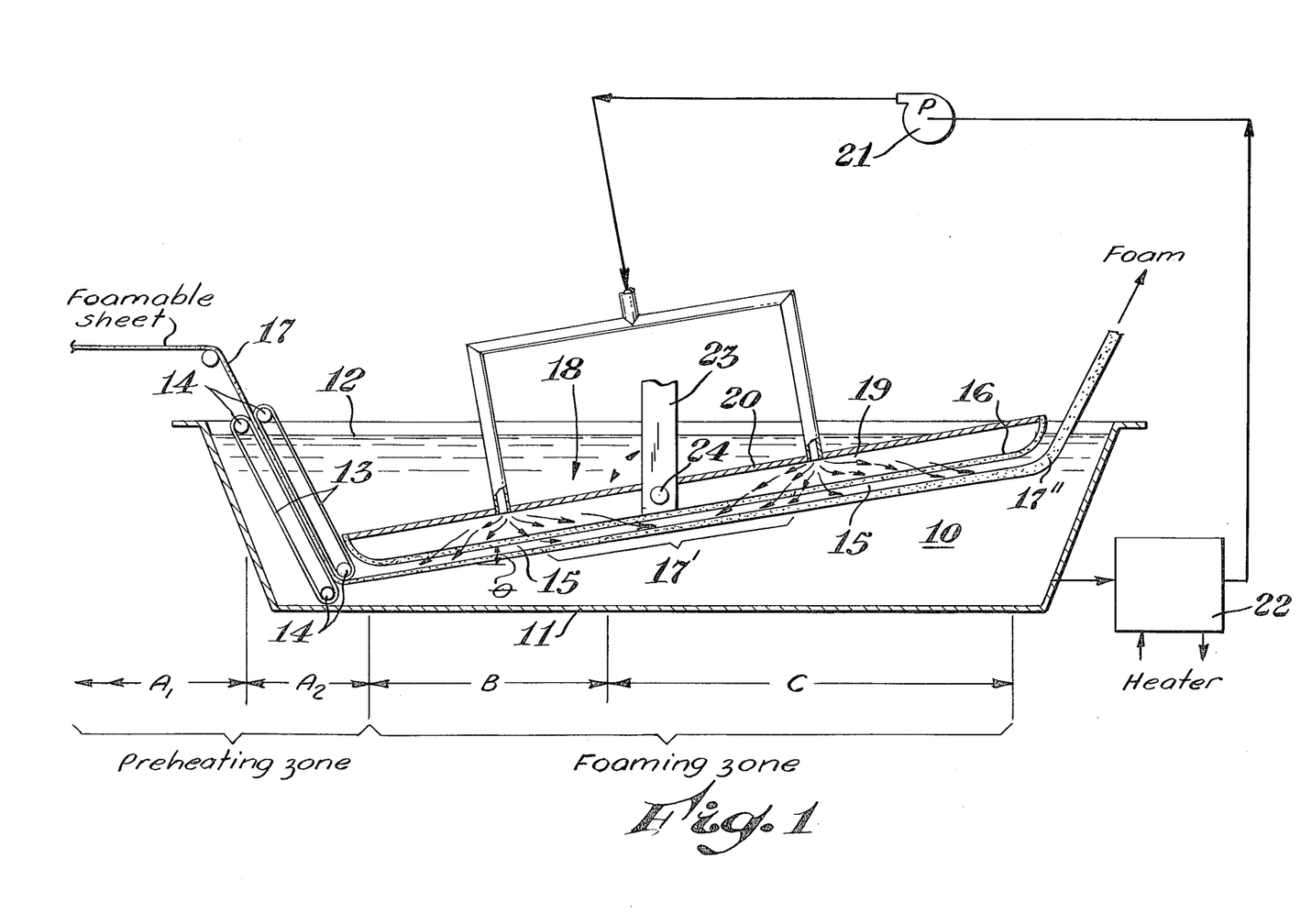
FIG. 1 of the drawing is a schematic of one embodiment of method and apparatus means according to the present invention.

The invention can be visualized by reference to the drawings. FIG. 1 schematically illustrates one embodiment of suitable method and apparatus. A body of heat transfer liquid 10 is maintained in a suitable vessel 11, heated and circulated within the vessel by conventional means (not shown), the body of liquid having an upper surface 12. A pair of endless belts 13 passing over cylindrical drums 14, are positioned so that the two preform engaging faces are generally parallel and that at least a segment of its length across the width thereof is submerged below the surface 12 of the liquid body 10 and thereby transports and guides the foamable preform 17 from its source (not shown) down through the liquid body to where it is supported and guided by the foam engaging dynamic layer 15 generated by stationary porous plate 16.

A long strip, belt or sheet of a preformed foamable resin composition 17 is taken from a source not shown through the pair of endless belts 13 driven by and/or rolling on rollers 14. The preform is thereby transported and guided beneath the surface of the liquid. The belts and rollers can be replaced by any device capable of transporting and guiding said preform into the body of liquid. In fact, in most instances the preform is stiff enough to be pushed by one set of drive rollers (not shown) down into the liquid heating bath and under the foam restraining means 18. Said preform then passes along beneath the microporous plate 16 where it foams to form foam product 17".

After the unfoamed preform is transported down into the bath, it reaches a point 17' where foaming begins. At this point the generally upward slope of the porous plate 16, which represents the lower foam engaging surface of foam restraining means 18, and the increasing buoyancy of the expanding foam itself helps pull the expanding preform through the bath. In addition to this force, the expanded preform can be pulled gently by a roller or other device (not shown) at a point after the foamed preform leaves the heating medium to aid transport through the bath and to facilitate its transport out of the bath. In this way, the foaming and foamed resin is continuously transported into, through and out of the heating medium.

In the initial portion of the path through the body of liquid, $A_2$, the resin preform is being heated by the liquid toward a temperature where the resin softens and the foaming agent is activated to form and/or expand gas cells therein. When the preform reaches that temperature and foams, it expands in all directions (.e., thickness, width and length). If the expansion is isotropic, each dimension increases by a factor which is the cube root of the volume expansion. Thus, in the region depicted by 17' in FIG. 1 the foaming material is increasing in thickness, width and length. Because its volume is increasing, the upward thrust of the preform by buoyancy forces is also increasing. Its natural tendency is to float toward the surface of the liquid medium, and this tendency must be restrained, at least until foaming is substantially complete, in order to obtain the advantages of submersion foaming. Moreover, the expansion of the preform means that adjacent points on the surface of said preform are moving apart both longitudinally and laterally of the preform. Thus, in the region depicted by 17', the surface elements on both sides of the longitudinal center line of the preform are moving away from that center line at velocity rates that accelerate as foaming proceeds vigorously, and are greater for surface elements nearer the edges of the preform. The lateral velocity of movement away from the center line subsequently decreases as foaming nears completion. Such surface elements are also moving away from each other in a longitudinal direction in region 17'. Thus, within region 17' as depicted, surface elements of the preform move laterally as well as accelerating in longitudinal velocity when the resin composition is foaming and is also soft and sticky. As the expansion of the foaming material nears completion, the tensile strength of the material decreases because the cell walls of the foamed resin matrix become thinner and the viscoelastic strength of the resin decreases as the foam temperature rises by heating from the surrounding liquid. Also, as the foam expands, the upward thrust caused by buoyancy forces increases. Accordingly, until the foamed product is taken from the submersion foaming bath, it must be supported while being held submerged in the liquid even though the foaming and foamed product is soft and sticky.

In accordance with this invention, the preform as depicted in FIG. 1 is restrained throughout the foaming zone against its upward buoyant thrust by a dynamic layer 15 of liquid which as it leaves the dynamic layer area becomes part of the body 10 of heat transfer liquid. Liquid layer 15 lies between the upward facing surface of the unfoamed, foaming and foamed preform, 17, 17' and 17'', and the downward facing surface of porous plate 16.

In the embodiment illustrated in FIG. 1, the dynamic liquid layer 15 is established and maintained by the forced diffusion, under pressure of a liquid material (preferably a circulating portion of the liquid employed as the heat transfer medium in the main body of the submersion foaming bath and preferably at substantially the same temperature as the main body of heat transfer medium in the submersion foaming bath), through pores in the lower foam engaging porous surface 16 of the foam restraining means 18. This forced diffusion may be accomplished by various means.

One such method, as illustrated in FIG. 1, is by supplying a portion of the heating medium liquid, from the main body 10 or from another auxiliary source, not shown, the liquid being at substantially the same temperature as the main body of the heating medium, to a chamber or plenum 19 which is located within the main body of the foam restraining means 18, the chamber being defined primarily by the porous plate 16 as the bottom or lower boundary and an essentially nonporous plate or shell 20 which is the top of the main body of the foam restraining means 18, the two plates 16 and 20 being combined or joined at their periphery, being either bent to provide for a chamber between, then joined directly to each other; or separated and spaced by one or more peripheral edge pieces which are joined to each plate at their respective peripheries, in any event, creating and sealing an interior chamber 19. In this way, the pores of porous plate 16 maintain operative communication between the pressurized chamber 19 and the thin dynamic layer, allowing diffusion from the chamber through the pores and out the foam engaging surface of the plate 16 to create the desired dynamic layer 15.

A pump system 21 is used to provide the pressure and supply the amounts of liquid required to achieve a constant diffusion of liquid through the pores of the plate 16. The source of this supply can be the main body of heating medium liquid or a separate reservoir and in either case, a heater 22 may be desired somewhere in the supply line. The pressure required for operating such a process depends on such factors as the depth of submersion in the liquid heating medium, the number, location and sizes of the pores in the porous plate, the angle at which the foam restraining means is maintained relative to horizontal, magnitude of the buoyancy forces needed to be overcome and the preform and foam transport speeds. Depending on these factors, the pressure can vary from approximately 0.1 to 100 pounds per square inch (psi) with a preferred range being from 2 to 20 psi.

The heating medium liquid 10 can be any of several high boiling point liquids which are safe, non-toxic and inert to the hot thermoplastic resin. Examples of such liquids are Dow Corning's silicon oil or molten metal alloys, with a preferred heating medium liquid being Hitec ® salt. The diffusing and diffused fluid is usually of the same composition as the heating medium liquid but can be an entirely different fluid or a combination of fluids designed to achieve a desired effect.

Still referring to FIG. 1, the preform feed end of the operation and of the foamer may comprise a preheating zone. Before entering the heat transfer liquid bath, the preform 17 may be partially preheated, e.g., in Preheating Zone $A_1$ depicted in FIG. 1, by conventional means not shown, e.g., by passing through a heated oven or between radiant heaters or the like. First immersion of the preform in the heat transfer liquid also effects preheating, e.g., in Preheating Zone $A_2$. Throughout the preheating zone, it is essential that the temperature of the preform not rise to the foaming temperature of the foamable resin composition. In an optional embodiment of this invention, this preheating zone could be used to heat the preform sheet to a sufficiently high temperature (below the foaming temperature) to activate chemical crosslinking agents previously incorporated in the foamable preform, thereby crosslinking said preform before foaming occurs. Beyond the Preheating Zone, the preform travels through the Foaming Zone as depicted in FIG. 1, the operations being such that, at some time after entering the Foaming Zone, the temperature of the preform rises to the foaming temperature of the resin composition, active foaming beginning in part B and being substantially completed in part C of that Zone, from which the resulting foam product is removed as foamed product preform 17''. The temperature of the liquid 10 can vary, taking into account its heat transfer properties, the velocity of incoming preform 17, the treatment, if any, of preform 17 in the Preheating Zone $A_1$, the decomposition temperature and amount of the blowing agent employed in the foamable preform, the softening and degradation temperatures of the thermoplastic resin employed, the maximum depth of immersion of preform 17 in the liquid body, the path and thus residence time of preform 17 in Preheating Zone $A_2$, and the path and residence time of the foaming preform 17' in the Foaming Zone, etc. These factors are inter-related, selected and adjusted so that foaming does not occur in the Preheating Zone and does occur and is completed in the Foaming Zone. As indicated in FIG. 1, the path of the foaming and foamed preform is upward in the foaming zone as the preform moves forward toward the outgoing end. The depth at which the foaming preform is maintained in the body of liquid is selected according to the pressure which is desired during the foaming step. This depth can be adjusted by extension or retraction of foam restraining means support member 23 which is adjustably attached to a stationary frame, not shown. Understandably, the greater the depth in the liquid (and greater the density of the liquid) the greater will be the hydrostatic pressure of liquid on the preform. The angle to the horizontal, $\theta$, at which the foaming preform is maintained in the body of liquid can be changed and is selected according to the buoyancy force and the tensile strength of the hot resin foam. Said angle, $\theta$, is adjusted by the rotation of foam restraining means 18 about axis 24 located where restraining means 18 is joined to the foam restraining means support member 23. The smaller the angle of the preform with the horizontal, the greater is the normal vector of buoyancy force transmitted by the preform to the dynamic layer of liquid 15, the more support required to counter-balance said increased bouyancy forces and to thereby prevent the foam from contacting and sticking to the porous plate. The greater that angle, the less likelihood of sticking problems, but the greater is the longitudinal tensile stress on the foam. Said angles with horizontal, $\theta$, are generally between 1 and 75 degrees with a preferred range being 5 to 45 degrees and a most preferred range being from 10 to 30 degrees.

As mentioned, the conditions of operation are varied to vary the residence time of the preform in the Foaming Zone. In some instances, conditions are selected so that expansion of the preform commences soon after entering the Foaming Zone. In still other instances, conditions are selected so that expansion of the preform does not commence until the preform is further along into Zone (B). In some such instances, e.g., where the foamed product is susceptible to collapse if held too long at high temperature, Foaming Zone (C) is made relatively short so that the foamed product is removed from the foamer promptly after the expansion of the foam is substantially complete.

The porous plate 16 can consist of any porous material with a plurality of pores in operative communication between the plenum 19 and the dynamic layer 15 caused to form between the foamable and/or foaming sheet 17, 17' and the surface of the porous plate 16 which forms the lower surface of the foam restraining means 18. Said porous plate would otherwise come in direct contact with the sticky foam article being prepared were it not for the dynamic layer. The pores described can be those occurring in a temperature resistent naturally porous material, for example, porous ceramic, glass or metal. Some suitable porous materials that are manufactured are Dynapore ® porous stainless steel sheet or Felt Metal ® sheets. The pores can also be achieved by drilling, piercing, or cutting a number of small holes or slits in a usually solid, nonporous material. The size of the pores or holes will depend on the viscosity of the liquid to be diffused therethrough. Using a heating medium of Hitec ® salt, holes with a diameter of the one-thirtysecond (1/32") to one-sixteenth (1/16") of an inch are adequate.

Having different pore sizes and different pore concentration in different areas of the porous plate can also facilitate production of certain types of foam. In general, transport of the foamable sheet and especially transport of the low density foaming sheet is made easier by increasing either the pore diameter or the pore concentration near the longitudinal center line of the porous plate, relative to the pore sizes and concentrations at points remote therefrom such as nearer the edges of the porous plate. By longitudinal center line of the porous plate it is meant a line equidistant from the edges of said porous plate and generally parallel to the direction that the foamable and foaming sheet travels. A benefit in foam production is achieved mainly because, for any given intrachamber pressure, the tendency is for the already diffused and diffusing liquid to move towards the edges of the foaming strip and away from the center. Therefore, a higher concentration of pores and/or larger sized pores located along and on either side of the center line of the porous plate in the direction of foam transport will prevent foam from contacting and/or sticking to the porous plate in those areas near said center line. In addition, the liquid under pressure will continue to diffuse laterally from the center out toward the edges combining the lesser amounts of liquid diffused in those areas thereby adding also to the dynamic layer existing there and further preventing the foam in those areas from contacting and/or sticking to the porous plate in areas remote from the center line. Thus, as a general rule, the total porosity required will depend on the magnitude of the buoyancy forces to be counter-balanced at different points along the path of material preform.

Still referring to FIG. 1, in another embodiment, not shown, the pressurized chamber 19 could be divided into two or more separate and individually pressurized chambers. In this way, two or more different fluids and/or fluids of two or more different temperatures could be diffused through the porous plate 16 at different points along the path of the preform to achieve different desired results with respect to treatment of the preform and/or with respect to maintenance of the protective dynamic fluid boundary layer.

Figure 1A:
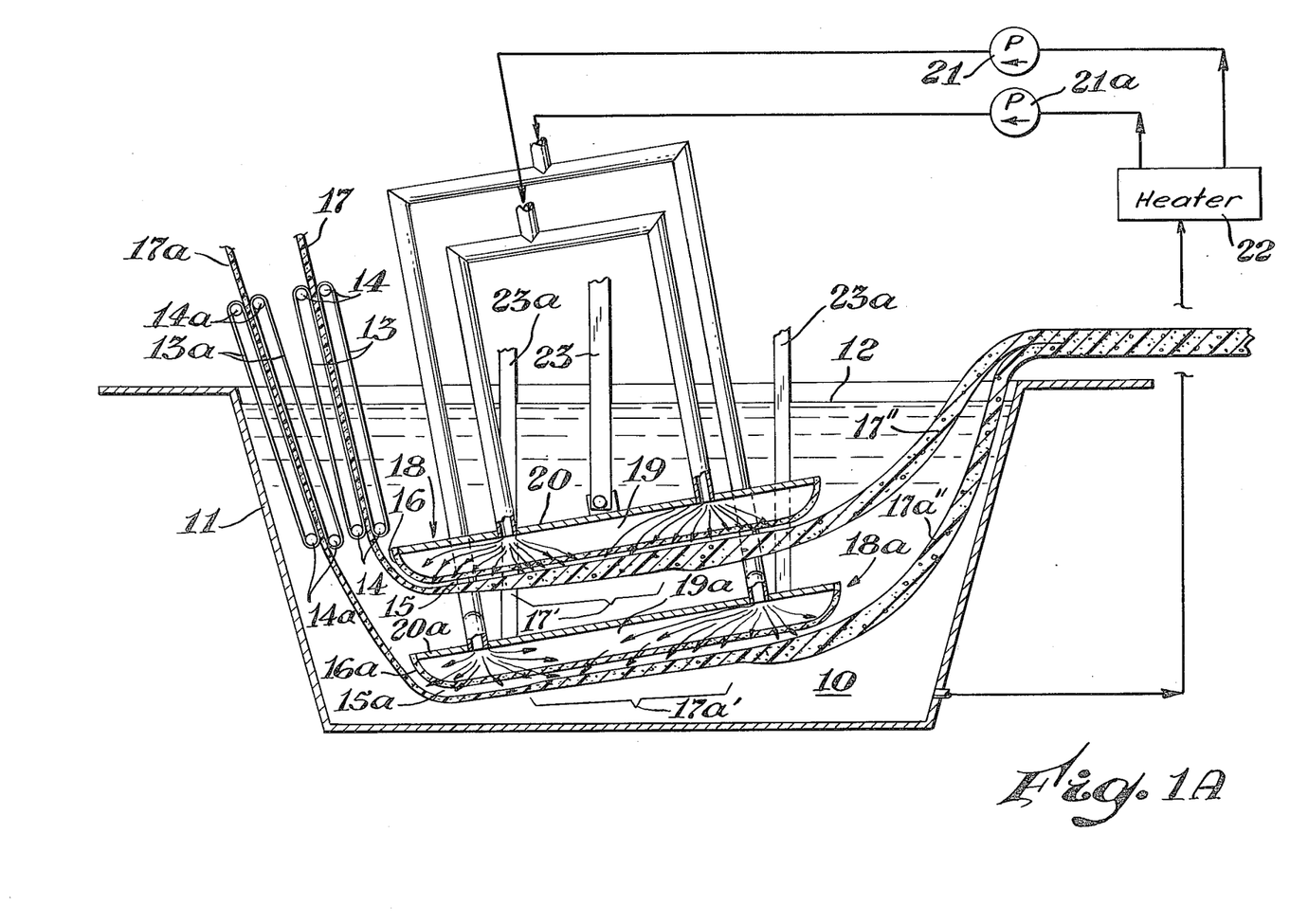
FIG. 1a is a schematic of an apparatus according to the present invention whereby a laminated sheet or strip can be achieved.

In FIG. 1a a device is shown utilizing two porous plates of the type shown in FIG. 1 and described above, said plates being arranged in layers to allow the simultaneous foaming of two foamable preforms. The foamed preforms are then laminated in a continuous process into a single sheet. The reference numerals in FIG. 1a are the same, and indicate the same types of elements as the numerals in FIG. 1, with the exception of those numerals containing the suffix "a." Those numerals with the suffix "a" indicate the same type of element as the numerals without an "a" in FIG. 1 and FIG. 1a except that the elements containing a suffix "a" are on a second identical plate assembly located below the first plate. The elements indicated by reference numerals in FIG. 1a are therefore identical in function to the correspondingly numbered elements described with respect to FIG. 1; the only difference being the illustration of a second identical plate in FIG. 1a.

Figure 2:
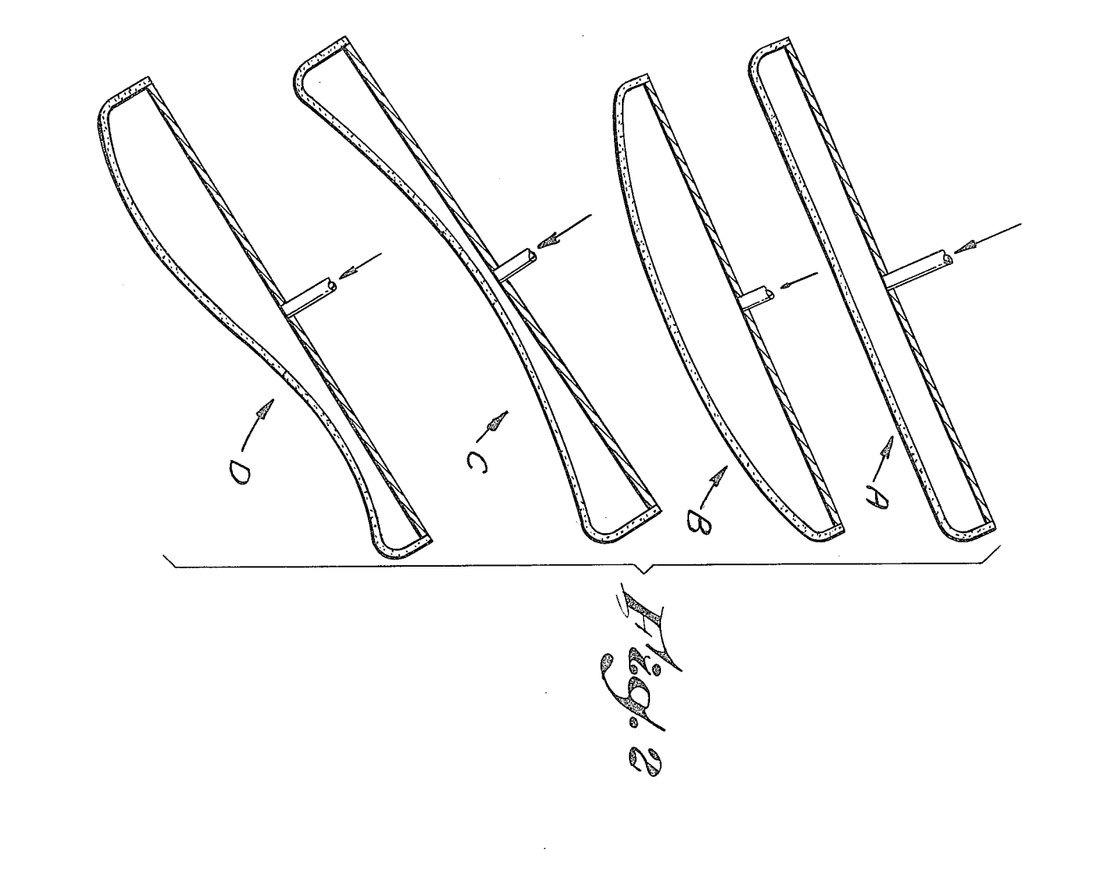
FIG. 2 shows several alternative shapes for the foam restraining means.

FIG. 2 shows four different porous plate foam restraining means shapes which can be used for the purpose of achieving certain desired characteristics in various foaming environments. In FIG. 2, the flat plate A is the simplest physically and is the easiest to mechanically fabricate. The angle which the lower surface of the flat porous plate makes with horizontal is constant at all points along the path of the preform. This angle can vary, depending on the foaming environment desired, between 0° and nearly vertical. Said flat plate would thereby treat the unexpanded resin sheet of low buoyancy and the expanded sheet of high buoyancy alike at all points. In embodiment B, the convex-down shaped plate, provides a progressively increasing angle with horizontal which makes the foam transport increasingly faster and easier as the foam expands. During expansion, the magnitude of the buoyancy force lifting the foam against the foam restraining means increases. As this happens, the angle which the porous plate B makes with the horizontal will also be increasing. Increasing this angle causes a decrease in the frictional force between the porous plate and the expanding foam and at the same time allows an increase in foam transporting speed in the direction up and out of the heating medium. The angles which the surface of the curved porous plate B makes with the horizontal at the different points along the path of the preform differ depending on how the plate is rotated and the differing potential curvatures of the convex down shaped plate. The angle at the lower end of the porous plate, nearest to the point where preform enters the heating medium and where the preform first passes under the porous plate can range from a small negative angle through zero to a small positive angle. The angle at the raised end of the porous plate, nearest to the point where the preform leaves the heating medium and where the preform passes out from underneath the porous plate can range from a relatively small angle to nearly vertical. In FIG. 2, shapes C and D achieve different effects, the concave portions causing increasing frictional forces as the foam is expanding and moving along the porous plate.

In a preferred embodiment of the present invention, the above-described foaming step is conducted via a multiple stage foaming technique disclosed in my copending patent application Ser. No. 212,168, filed even date herewith and entitled Multi-Staged Foaming of Thermoplastic Resin. In accordance with such embodiment, a heat foamable thermoplastic resin is heated and foamed in a series of foaming stages. The series comprises at least one stress-relieving stage where the preform is heated at a temperature above the blowing agent decomposition temperature but below that temperature at which non-unifom expansion causes distorting and/or tearing in the heat weakened foam. The series also comprises at least one additional foaming stage where the partially expanded preform is heated to a higher temperature which can be and preferably is, for economic reasons, above the before-mentioned temperature at which tearing and distorting can occur in a single stage. This multi-stage foaming process allows economical production of thick, low density foams.

The apparatus and process schematically shown in FIG. 1 essentially comprise means for submerging a piece of material into a body of liquid wherein the material is in sticky and/or weak strength condition so as to make it difficult to handle such material while in such liquid, the present improvement being characterized by supporting such material in such liquid by a dynamic layer of the liquid. The apparatus and means of FIG. 1 are particularly adapted for materials which tend to float in the liquid medium of concern (i.e., when liquids of greater density than the treated material are employed), such as in the case of the illustrated foaming resin materials. It will be obvious, however, that in the treatment of materials having a greater density than the liquid medium employed (i.e., where the treated material tends to sink in the liquid medium), the supporting dynamic layer of liquid and the porous plate, which generates such dynamic layer of liquid will be positioned beneath the solid material preform, e.g., strip, being processed. Many variations, e.g., of the means and apparatus of FIG. 1, will be obvious to the skilled mechanic.

While the present invention has been described by reference to particular embodiments thereof, such embodiments are not to be interpreted as limiting the scope of the instant claimed invention.

What is claimed is:

1. In a continuous method of preparing a thermoplastic foam article wherein a heat foamable crosslinked thermoplastic preform is heated to a temperature at or above the foaming temperature of the foamable preform, said foaming temperature being at or above the decomposition temperature of a blowing agent compounded in the preform and at or above the heat softening temperature of the thermoplastic resin, said heating achieved by submerging said preform into and passing it through and out of a body of a liquid heat transfer medium which is at or above the foaming temperature of the foamable preform, said preform being thereby heated and foamed during which time said preform is typically soft, sticky and/or of low tensile strength, the resulting foamed resin product then being removed from the body of the heat transfer liquid, which liquid has a greater density than the foaming and foamed resin product, the improvement wherein the foamable and foaming resin preform is held submerged while in the body of heat transfer liquid under and by a protective dynamic fluid boundary layer generated by the forced diffusion of a fluid through the pores of a stationary porous plate, said diffused fluid being at substantially the same temperature as the liquid heat transfer medium, said dynamic fluid layer separating and preventing contact between the soft, sticky, foamable, foaming and foamed resin preform and the surface of the porous plate.

2. The improvement according to claim 1, wherein the shape of the porous plate is flat and the angle which it makes with the horizontal is constant at all points along the path of the preform, said porous plate being able to be rotated to and fixed at various angles with the horizontal, the raised end being that end of the porous plate farthest from the point where the preform enters the heat transfer medium and closest to the point where the preform leaves the heat transfer medium, the angle which the porous plate makes with the horizontal being from 5° to 45°.

3. The improvement according to claim 1, wherein the shape of the porous plate is convex-down, the end of that plate closest to the point where the preform enters the heat transfer medium fluid being lower than the end of said plate closest to where the preform leaves the fluid, the angle which said plate makes with the horizontal gradually increasing at successive points along the path of the preform.

4. The improvement according to claim 1, wherein two or more of the porous plates are used in layers, one being below the other, to allow the simultaneous foaming of two or more foamable preforms which are then laminated in a continuous process into a single sheet.

5. Apparatus for continuously forming foamed resin products from heat foamable thermoplastic resin preforms, which apparatus comprises a vessel adapted for holding a body of heat transfer liquid, means for controllably heating said liquid at a temperature above the heat foaming temperature of the foamable thermoplastic resin preform, means for continuously passing the foamable resin preform into and submerging it in the body of heat transfer liquid, whereby the foamable resin preform is heated to its foaming temperature and foams, and means for continuously taking the resulting foamed resin product out of the body of heat transfer liquid, which liquid is more dense than the foaming and foamed resin product, which apparatus also comprises and is particularly characterized by a porous plate means, through the pores of which is forcibly diffused amounts of the heat transfer liquid sufficient to generate and maintain a dynamic layer of the heat transfer liquid above resin preform and below the porous plate, the dynamic layer holding the foaming resin preform submerged while in the body of heat transfer liquid, said porous plate means being positioned above the path to be taken by the foamable and foaming resin preform through the apparatus at least from a point just before the resin preform would reach its heat foaming temperature to a point where the foaming of the foamable resin preform would be substantially complete.

* * * * *

UNITED STATES PATENT AND TRADEMARK OFFICE
CERTIFICATE OF CORRECTION

PATENT NO. : 4,333,780
DATED : June 8, 1982
INVENTOR(S) : Sambasiva R. Allada

It is certified that error appears in the above—identified patent and that said Letters Patent is hereby corrected as shown below:

The Title should be corrected to read -- SUBMERSION TREATMENT OF FOAMABLE THERMOPLASTIC SHEET OR PREFORM --;

Col. 4, line 29, "foamed" should read -- foam --;

Col. 4, line 53, "whenever" should read -- wherever --;

Col. 6, line 36, "(.e.," should read -- (i.e., --;

Col. 9, line 67, insert "with" after "combining";

Col. 11, line 20, "non-unifom" should read -- non-uniform --.

Signed and Sealed this

Second Day of November 1982

[SEAL]

Attest:

GERALD J. MOSSINGHOFF

Attesting Officer   Commissioner of Patents and Trademarks